United States Patent
Robertson et al.

(10) Patent No.: US 9,652,413 B2
(45) Date of Patent: May 16, 2017

(54) SIGNAL PROCESSING SYSTEM AND INTEGRATED CIRCUIT COMPRISING A PREFETCH MODULE AND METHOD THEREFOR

(75) Inventors: Alistair Robertson, Glasgow (GB); Joseph Circello, Phoenix, AZ (US); Mark Maiolani, East Kilbride (GB)

(73) Assignee: NXP USA, Inc., Austin, TX (US)

( * ) Notice: Subject to any disclaimer, the term of this patent is extended or adjusted under 35 U.S.C. 154(b) by 731 days.

(21) Appl. No.: 13/382,796

(22) PCT Filed: Jul. 20, 2009

(86) PCT No.: PCT/IB2009/053138
§ 371 (c)(1),
(2), (4) Date: Jan. 6, 2012

(87) PCT Pub. No.: WO2011/010183
PCT Pub. Date: Jan. 27, 2011

(65) Prior Publication Data
US 2012/0124336 A1    May 17, 2012

(51) Int. Cl.
*G06F 9/30* (2006.01)
*G06F 13/16* (2006.01)
*G06F 12/0862* (2016.01)

(52) U.S. Cl.
CPC ...... *G06F 13/1631* (2013.01); *G06F 12/0862* (2013.01)

(58) Field of Classification Search
CPC .... G06F 9/3802; G06F 13/28; G06F 12/0879; G06F 12/0862; G06F 9/383; G06F 2212/6028; G06F 9/30101

USPC ................................... 712/E9.55, E12.053
See application file for complete search history.

(56) References Cited

U.S. PATENT DOCUMENTS

| | | | |
|---|---|---|---|
| 6,151,662 A * | 11/2000 | Christie et al. | 711/145 |
| 6,760,818 B2 * | 7/2004 | van de Waerdt | 711/137 |
| 6,871,246 B2 | 3/2005 | Moyer | |
| 6,963,954 B1 * | 11/2005 | Trehus et al. | 711/137 |
| 7,383,391 B2 * | 6/2008 | Davis et al. | 711/137 |
| 7,555,609 B2 * | 6/2009 | Duncan et al. | 711/137 |
| 7,836,259 B1 * | 11/2010 | Filippo et al. | 711/137 |
| 8,356,143 B1 * | 1/2013 | Bulusu et al. | 711/137 |
| 2004/0133747 A1 | 7/2004 | Coldewey | |

(Continued)

FOREIGN PATENT DOCUMENTS

JP    2008-009857 A    1/2008

OTHER PUBLICATIONS

International Search Report and Written Opinion correlating to PCT/IB2009/053138 dated May 20, 2010.

*Primary Examiner* — William B Partridge

(57) ABSTRACT

A signal processing system comprising at least one master device at least one memory element and prefetch module arranged to perform prefetching from at least one memory element upon a memory access request to the at least one memory element from the at least one master device. Upon receiving a memory access request from the at least one master device, the prefetch module is arranged to configure the enabling of prefetching of at least one of instruction information and data information in relation to that memory access request based at least partly on an address to which the memory access request relates.

19 Claims, 3 Drawing Sheets

(56) References Cited

U.S. PATENT DOCUMENTS

2006/0069910 A1* 3/2006 Radhakrishnan ... G06F 12/0862
    713/100
2006/0174228 A1* 8/2006 Radhakrishnan ... G06F 9/30047
    717/127

* cited by examiner

SIGNAL PROCESSING SYSTEM AND INTEGRATED CIRCUIT COMPRISING A PREFETCH MODULE AND METHOD THEREFOR

FIELD OF THE INVENTION

The field of this invention relates to a signal processing system comprising a prefetch module and method therefor, and more particularly to a signal processing system a comprising prefetch module arranged to perform prefetching from a memory element upon a memory access request to the memory element from a master device, and method therefor.

BACKGROUND OF THE INVENTION

In signal processing systems, fetching instructions and data from memory is often a slow process compared to the operating frequency of the master device that has initiated the fetch instruction. Consequently, if the system is running a large number of such fetch operations, it can cause a significant decrease in the overall system performance. It is known to implement pre-fetching schemes, whereby data and/or instructions are fetched in advance of the master device initiating a fetch instruction for them. As a result the performance impact of accessing relatively slow memory elements may be reduced.

However, a problem with implementing such prefetching schemes is that it is not always possible to accurately 'predict' the instructions and/or data that a master device is going to require, and the timing thereof, and as such unnecessary prefetch operations are often performed. Performing such unnecessary prefetches can hinder system performance, since they use up system resources in order to be performed, especially where flash memory access requests are non-abortable. Accordingly, inappropriate configuration of such prefetching schemes may render their effectiveness as, at best, sub-optimal, or even detrimental to the system performance.

SUMMARY OF THE INVENTION

The present invention provides a signal processing system, an integrated circuit comprising such a signal processing system, and a method therefor, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

Examples will now be described with reference to a signal processing system substantially integrated within a single integrated circuit, such as a system on chip (SoC) device. However, it will be appreciated that the examples herein described are not limited to use within such an integrated signal processing system, and may equally be applied to alternative signal processing arrangements and architectures. Furthermore, because the example apparatus implementing the present invention is, for the most part, composed of electronic components and circuits known to those skilled in the art, circuit details will not be explained in any greater extent than that considered necessary as illustrated below, for the understanding and appreciation of the underlying concepts of the invention and in order not to obfuscate or distract from the teachings of the invention.

Figure 1:
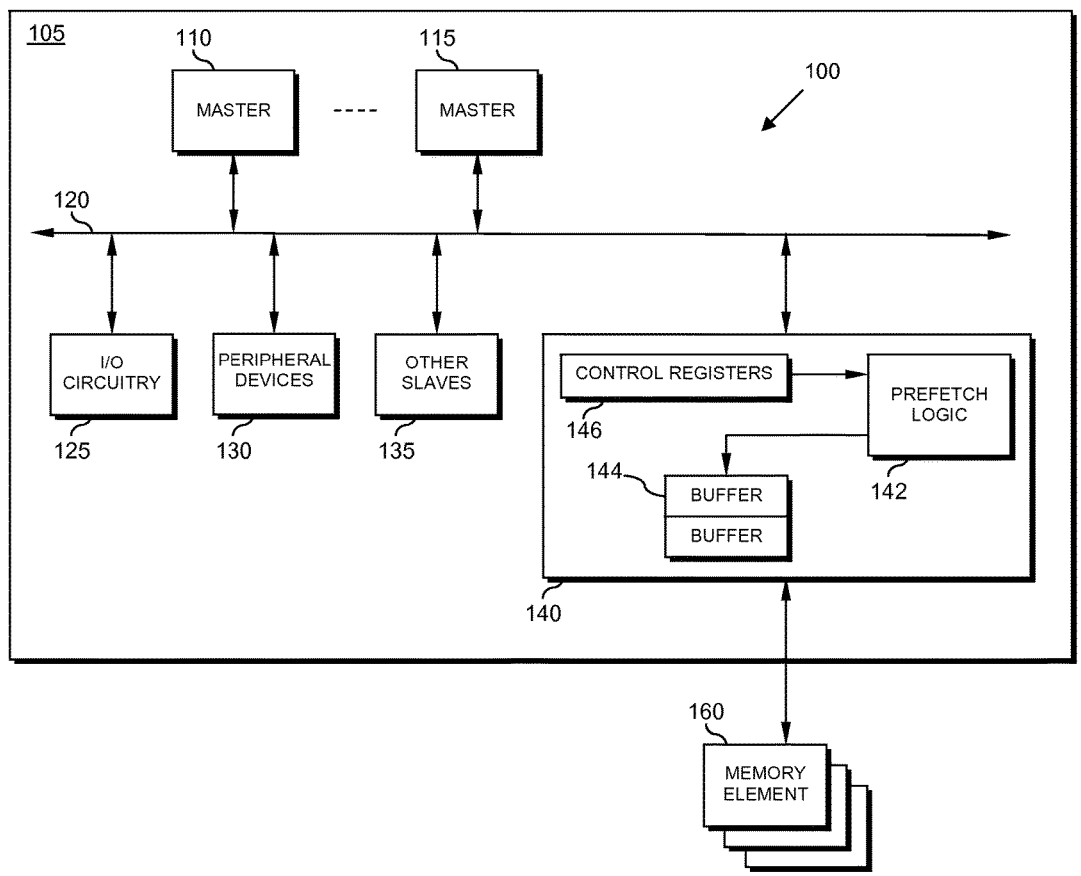
FIG. 1 illustrates an example of a signal processing system.

Referring now to FIG. 1, there is illustrated an example of a signal processing system 100. For the illustrated example, the signal processing system 100 is integrated within an integrated circuit (IC) 105. The signal processing system 100 of FIG. 1 comprises one or more master devices 110, 115 operably coupled to a system interconnect 120. Typical master devices may comprise a CPU or a DMA (Direct Memory Access) controller. Other master devices could include communication processors like Ethernet or FlexRay controllers, graphics processors and/or controllers, etc. In some examples, master devices that are external to the integrated circuit may also be operably coupled to the system interconnect 120, for example via an interconnect pin (or bus) (not shown) on the IC 105. System interconnect 120 may be implemented in any suitable manner, such as by way of a system bus operating according to a system bus protocol, such as the Peripheral Component Interface (PCI) protocol or ARM's Advanced Microcontroller Bus Architecture (AMBA™) protocol. Alternatively, system interconnect 120 may comprise switching circuitry, which routes information between different master and slave devices connected thereto.

One or more slave devices are also operably coupled to the system interconnect 120, which for the illustrated example comprises: input/output (I/O) circuitry 125, peripheral devices 130 and other slave devices 135. These slave devices are illustrated in FIG. 1 as also being integrated within the IC 105. However, some or all of the slave devices may alternatively be located externally to the IC 105. The signal processing system 100 further comprises prefetch module 142, which for the illustrated example forms part of memory access request module 140 operably coupled to system interconnect 120, and arranged to provide access to one or more memory elements 160. For the illustrated example, the one or more memory element(s) 160 is/are shown as being external to the IC 105. However, it is contemplated that one or more memory elements may be integrated within the IC 105.

The prefetch module 142 is arranged to perform prefetching from the one or more memory element(s) 160 upon receiving a memory access request to the memory element(s) 160 from a master device 110, 115. In particular, upon receiving a memory access request from a master device 110, 115, for example received by the memory access request module 140 via the system interconnect 120, the prefetch module 142 is arranged to configure the enabling of prefetching of instruction information and/or data information in relation to that memory access request, based at least partly on an address to which the memory access request relates.

For example, the prefetch module 142 may be arranged to compare the address to which the memory access request relates to one or more address ranges associated with, say, data structures (e.g. maps, images, etc.). If the address to which the memory access request relates falls within said address range(s), the prefetch module 142 may then be arranged to enable prefetching of data information in relation to that memory access request. The prefetch module 142 may also be arranged to disable prefetching of instruction information in relation to that memory access request if the address to which the memory access request relates falls within said address range(s) associated with data structures.

Additionally and/or alternatively, in other examples the prefetch module 142 may be arranged to compare the address to which the memory access request relates to one or more address ranges associated with, say, program code, such as operating system code and/or application code, and if the address to which the memory access request relates falls within said address range(s), the prefetch module 142 may then be arranged to enable prefetching of instruction information in relation to that memory access request. The prefetch module 142 may also be arranged to disable prefetching of data information in relation to that memory access request if the address to which the memory access request relates falls within said address range(s) associated with program code.

For the example illustrated in FIG. 1, the memory access request module 140 comprises one or more control registers 146 arranged to be configured to store, for example, address range parameters, such as 'start' and 'end' addresses for one or more address ranges. Furthermore, the one or more control registers 146 may be configured to store one or more parameter(s) that define whether prefetching is to be enabled or disabled in relation to memory access requests to addresses within each of those address ranges.

Figure 2:
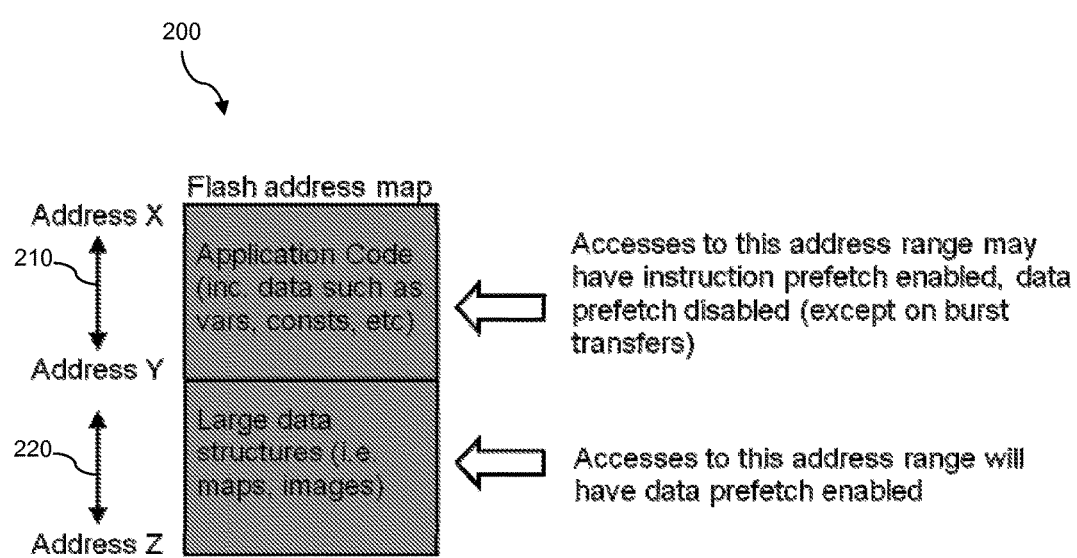
FIG. 2 illustrates an example of an address map.

FIG. 2 illustrates an example of an address map 200 for a memory element 160. Two address ranges are defined: a first address range 210 between Address X and Address Y; and a second address range 220 between Address Y and Address Z. Accordingly, the one or more control registers 146 of FIG. 1 may be configured to store the start and end address of each of the address ranges 210, 220. For each address range 210, 220, the one or more control registers 146 may further be configured to store one or more parameter(s) that define, for example, whether instruction prefetching is to be enabled, and whether data prefetching is to be disabled for accesses to addresses within the respective address ranges 210, 220.

In this manner, the enabling and disabling of prefetching may be configured based on addresses to which memory access requests relate. Thus, and by way of example, by appropriately arranging, say, program code and data structures within memory, for example such that large data structures, such as maps and images, are stored within one or more specific address ranges, prefetching for accesses to addresses within such an address range may be configured appropriately. For example, for address ranges associated with large data structures, such as the second address range 220 of FIG. 2, it may appropriate for data prefetching to be enabled in order to reduce any potential performance impact of accessing such large data structures from relatively slow memory elements. However, since it may be assumed that few (if any) lines of instruction information will be stored within such address ranges associated with data structures, it may be appropriate for instruction prefetching to be disabled within this address range in order to prevent unnecessary prefetching being performed and unnecessarily consuming system resources.

Conversely, by storing program code and other instruction information within one or more specific address ranges, such as the first address range 210 of FIG. 2, prefetching for access to addresses within such an address range may also be configured appropriately. For example, for address ranges associated with, say, program code, it may be appropriate for instruction prefetching to be enabled in order to reduce performance impact of accessing large sections of program code from relatively slow memory elements. However, since it may be assumed that only small data structures, such as variables and constants, are likely to be stored within such address ranges associated with program code, it may be appropriate for data prefetching to be disabled in order to prevent unnecessary prefetching being performed and unnecessarily consuming system resources.

Accordingly, referring back to FIG. 1, upon receipt of a memory access request by memory access request module 140, prefetch module 142 may be arranged to compare an address to which the memory access request relates to one or more address ranges defined by parameters stored within the one or more control registers 146, and if the address to which the memory access request relates falls within an address range defined within the one or more control registers 146, to configure the enabling of prefetching of instruction information and/or data information in relation to that memory access request in accordance with corresponding one or more configuration parameter(s) stored within the one or more control registers 146. The prefetch module 142 may then execute the prefetching in accordance with said configuration, fetching information as configured from the one or more memory element(s) 160, and storing the fetched information within buffers 144. In this manner, the prefetched information is subsequently available for access by, say, one of the master devices 110, 115, thereby avoiding the need for a relatively slow access to memory 160 to be performed at that time in order to retrieve the information, and thus avoiding the corresponding degraded system performance.

As previously mentioned, the prefetch module 142 may be arranged to disable prefetching of data information in relation to memory access requests to an address range associated with, say, program code in order to avoid unnecessary data information prefetches being performed. However, if such a memory access request comprises a data burst transfer (or part thereof), disabling data information prefetches may cause unnecessary delay to such a data burst transfer. Consequently, in a further example, if the address to which the memory access request relates falls within an address range associated with program code, the prefetch module 142 may be arranged to determine whether the memory access request comprises a data burst transfer, and if the memory access request does comprise a data burst transfer, the prefetch module 142 may be arranged to enable prefetching of data information in relation to that memory access request.

Additionally, in some examples, the one or more control registers 146 is/are configured to store a further parameter for each address range, such as the address ranges 210, 220 of FIG. 2, defining whether data burst prefetching is to be enabled for the respective address range. Thus, for the example illustrated in FIG. 2, the one or more control registers 146 may be configured to store parameters for the first address range 210 defining: start address=X; end address=Y; instruction prefetch enabled; data prefetch disabled; and data burst prefetch enabled;

Conversely, in some examples, the one or more control registers 146 is/are configured to store parameters for the second address range 220 defining: start address=Y; end address=Z; instruction prefetch disabled; data prefetch enabled; and data burst prefetch enabled.

In one example, the prefetch module 142 may be arranged to configure other aspects of prefetching in relation to a received memory access request. For example, the prefetch module 142 may be arranged to configure a number of buffer lines to prefetch in relation to a memory access request from, say, a master device 110, 115 based on, say, the address to which the memory access request relates or the type of information (e.g. instruction or data) to be prefetched. For the example illustrated in FIG. 1, such configuration may be defined by one or more parameter(s) stored within the one or more control registers 146.

The prefetch module 142 may further be arranged to determine whether prefetching in relation to a memory access request is permitted for a respective master device 110, 115 from which the memory access request originated, for example as defined by one or more parameter(s) stored within the one or more control registers 146. If it is determined that prefetching is not permitted for the respective master device from which a memory access request originated, the prefetch module 142 may then disable prefetching in relation to that memory access request.

In accordance with some examples, if the address to which a memory access request relates does not fall within an address range defined within, say, the one or more control registers 146, the prefetch module 142 may be arranged to configure the enabling of prefetching of instruction information and/or data information in relation to that memory access request in accordance with default settings. For the example illustrated in FIG. 1, such default settings may also be stored within control registers 146. Similarly, if the address to which memory access request relates does not fall within an address range defined within, say, the one or more control registers 146, the prefetch module 142 may be arranged to configure other aspects of prefetching in relation to the received memory access request, such as the number of buffer lines to prefetch, etc.

The one or more control registers 146 may be programmable, for example by one or more of the master devices 110, 115. In this manner prefetch configuration may be programmed and modified in order to tune and regulate the prefetching of instructions from the memory element(s) 160.

Figure 3:
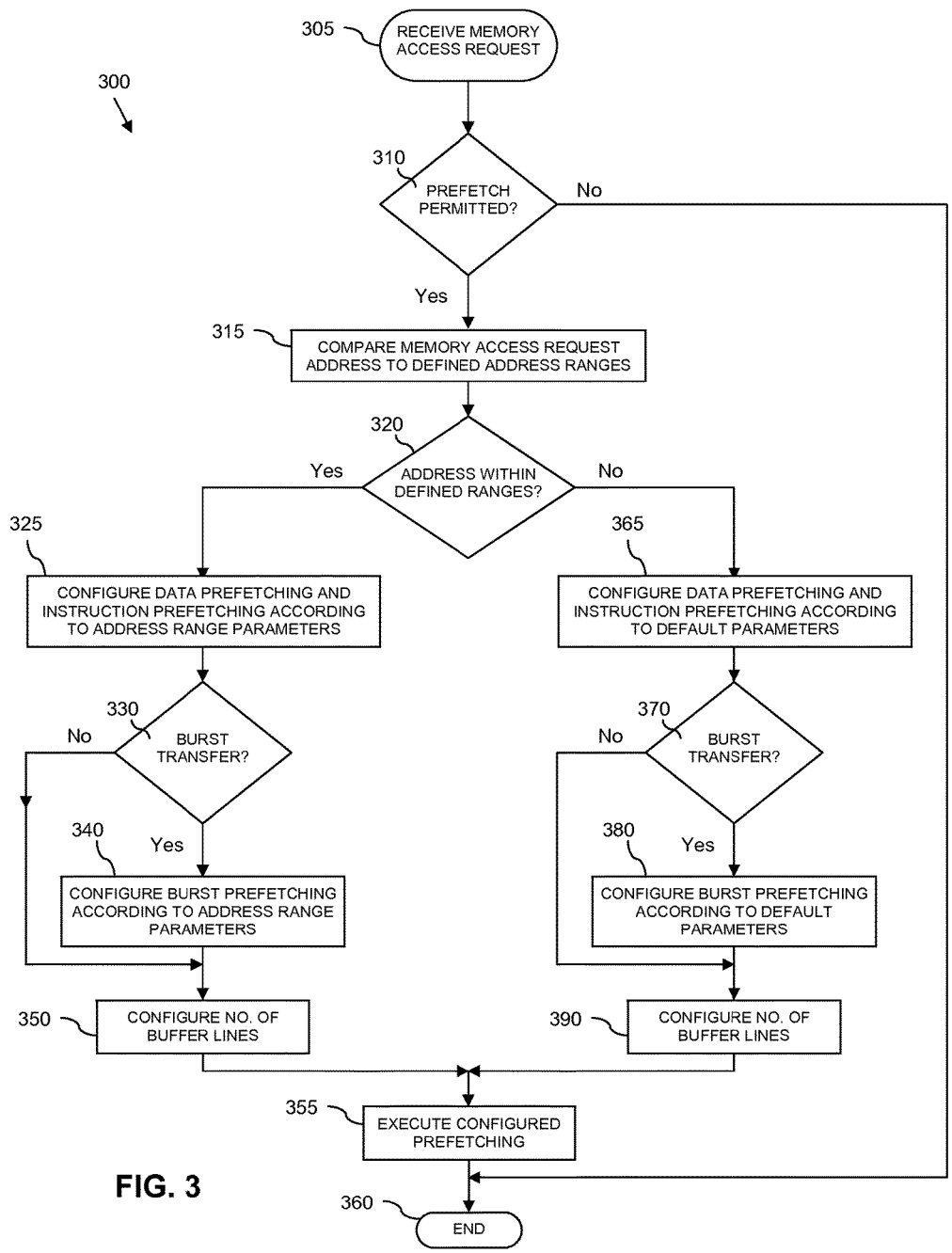
FIG. 3 illustrates an example of a simplified flowchart of a method for performing prefetching operations from a memory element.

Referring now to FIG. 3, there is illustrated an example of a simplified flowchart 300 of a method for performing prefetching from one or more memory element(s), for example as may be implemented within the signal processing system 100 of FIG. 1. In summary, the method comprises receiving a memory access request to at least one memory element, and configuring the enabling of prefetching of at least one of instruction information and data information in relation to that memory access request based at least partly on an address to which the memory access request relates.

More specifically, for the example illustrated in FIG. 3, the method starts at step 305 with a receipt of a memory access request from, say, a master device. For example, for the signal processing system 100 of FIG. 1 the method starts with the receipt of a memory access request by memory access module 140 from one of the respective master devices 110, 115. Next, in step 310, it is determined whether prefetching is permitted for the respective master device from which the memory access request originated. If prefetching is not permitted for the master device from which the memory access request originated, the method jumps to step 360 and ends. However, if prefetching is permitted for the respective master device from which the memory access request originated, the method moves on to step 315, where an address to which the memory access request relates is compared to one or more defined address ranges, and in particular for the illustrated example to one or more program code address range(s) and one or more data address range(s).

If the address to which the memory access request relates falls within the one or more defined address ranges, in step 320, the method moves to step 325, where data prefetching and instruction prefetching are configured according to parameters for the relevant defined address range, namely the address range within which the address to which the memory access request relates falls. Next, it is determined whether the received memory access request comprises a data burst transfer, in step 330. If the memory access request does comprise a data burst transfer, the method moves on to step 340, where data burst prefetching is configured according to parameters for the relevant defined address range. The number of buffer lines to be prefetched is then configured in step 350 before the method moves on to step 355 and the configured prefetches are executed. Referring back to step 330, if the memory access request does not comprise a data burst transfer, the method moves straight on to step 350, where the number of buffer lines to be prefetched is configured, before the method moves on to step 355 and the configured prefetches are executed.

Referring back to step 320, if the address to which the memory access request relates does not fall within the one or more defined address ranges, the method moves on to step 365, where data prefetching and instruction prefetching are configured according to default parameters. Next, it is determined whether the received memory access request comprises a data burst transfer, in step 370. If the memory access request does comprise a data burst transfer, the method moves on to step 380, where data burst prefetching is configured according to default parameters. The number of buffer lines to be prefetched is then configured in step 390 before the method moves on to step 355 and the configured prefetches are executed. Referring back to step 370, if the memory access request does not comprise a data burst transfer, the method moves straight on to step 390, where the number of buffer lines to be prefetched is configured, before the method moves on to step 355 and the configured prefetches are executed. Once the configured prefetching is executed in step 355, the method moves to step 360 and ends.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, memory element(s) 160 may be located on a same integrated circuit as masters 110 and 115 or on a separate integrated circuit or located within another peripheral or slave discretely separate from other elements of system 100. Peripheral 130 and I/O circuitry 125 may also be located on separate integrated circuits or devices. Also for example, system 100 or portions thereof may be soft or code representations of physical circuitry or of logical representations convertible into physical circuitry. As such, parts of system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing system comprising:
    a memory;
    a master device to issue a request to access information at the memory, the request including an access address;
    a programmable control register to define a first range of memory addresses and first parameters that define whether prefetching is enabled for accesses to addresses within the first range of memory addresses, a second range of memory addresses and second parameters that define whether prefetching is enabled for accesses to addresses within the second range of memory addresses, and default settings that define whether prefetching is enabled for accesses to addresses that are not within the first or the second range of memory addresses; and
    a prefetch module to determine whether prefetching of information relative to the access address is enabled based on the first parameters in response to determining that the access address is included in the first range of memory addresses, to determine whether prefetching of information relative to the access address is enabled based on the second parameters in response to determining that the access address is included in the second range of memory addresses, and to determine whether prefetching of information relative to the access address is enabled based on the default settings in response to determining that the access address is not included within the first range of memory addresses or within the second range of memory addresses.

2. The processing system of claim 1, wherein the programmable control register further defines a parameter specifying that the first range of memory addresses is associated with data structures, and if the access address falls within the first range of memory addresses, the prefetch module is arranged to enable prefetching if the request is a data request.

3. The processing system of claim 2, wherein the prefetch module is arranged to disable prefetching if the request is an instruction request.

4. The processing system of claim 1, wherein:
    the programmable control register further defines a parameter specifying whether burst prefetching is enabled for accesses to addresses within the first range of memory addresses if the request is a burst request.

5. The processing system of claim 1, wherein the programmable control register further defines a parameter specifying that the first range of addresses is associated with program code, and if the access address falls within the first range of memory addresses, the prefetch module is arranged to enable prefetching if the request is an instruction request.

6. The processing system of claim 5, wherein the prefetch module is arranged to disable prefetching if the request is a data request.

7. The processing system of claim 5, wherein the programmable control register further defines a parameter specifying that burst prefetching is enabled for accesses to addresses within the first range of memory addresses, and the prefetch module is arranged to enable prefetching if the request is a data burst request.

8. The processing system of claim 1, wherein the prefetch module is further arranged to configure a number of buffer lines to prefetch based on an attribute of the request.

9. The processing system of claim 1, wherein the prefetch module is arranged to determine whether prefetching is permitted for requests from the master device, and to disable prefetching if prefetching is not permitted.

10. A method comprising:
    defining, at a programmable control register, a first range of memory addresses and first parameters that define whether prefetching is enabled for accesses to addresses within the first range of memory addresses, a second range of memory addresses and second parameters that define whether prefetching is enabled for accesses to addresses within the second range of memory addresses, and default settings that define whether prefetching is enabled for accesses to addresses that are not within the first or the second range of memory addresses;
    receiving a request to access information from a memory, the request from a master device and including an access address;
    receiving the access address at a prefetch module; and
    determining, at the prefetch module, whether prefetching of information relative to the access address is enabled based on the first parameters in response to determining that the access address is included in the first range of memory addresses, determining whether prefetching of information relative to the access address is enabled based on the second parameters in response to determining that the access address is included in the second range of memory addresses, and determining whether prefetching of information relative to the access address is enabled based on the default settings in response to determining the access address is not included within the first range of memory addresses or within the second range of memory addresses.

11. The method of claim 10, wherein the first range of memory addresses is associated with data structures, and if the access address falls within the first range of memory addresses, enabling prefetching if the request is a data request.

12. The method of claim 11, further comprising disabling prefetching if the request is an instruction request.

13. The method of claim 10, wherein the first range of memory addresses is associated with program code, and if the access address falls within the first range of memory addresses, enabling prefetching if the request is an instruction request.

14. The method of claim 13, further comprising disabling prefetching if the request is a data request.

15. The method of claim 13, wherein the programmable control register further defines a parameter specifying that burst prefetching is enabled for accesses to addresses within the first range of memory addresses, enabling prefetching if the request is a data burst request.

16. The method of claim 10, further comprising determining whether prefetching is permitted for requests from the master device, and disabling prefetching if prefetching is not permitted.

17. The method of claim 10, wherein the programmable control register further defines a second range of memory addresses, and if the access address does not fall within the first or within the second range of memory addresses, determining whether prefetching is enabled in accordance with the default settings.

18. A device comprising:
a programmable control register to store information identifying a first range of memory addresses, a second range of memory addresses, parameters that define whether prefetching is enabled for accesses to addresses within the first and second range of memory addresses, and default settings; and
a prefetch module to:
receive a request to access information from a memory, the request from a master device and including an access address; and
determining whether prefetching of information relative to the access address is enabled in response to determining the access address is included in the first range of memory addresses or is included in the second range of memory addresses;
wherein if the access address does not fall within the first range of memory addresses, within the second range of memory addresses, or within another identified range of memory addresses, determining whether prefetching is enabled in accordance with the default settings.

19. The device of claim 18, wherein:
the first range of memory addresses is associated with data structures, and if the access address falls within the first range of memory addresses, the prefetch module is to enable prefetching if the request is a data request; and
the second range of memory addresses is associated with program code, and if the access address falls within the second range of memory addresses, the prefetch module is arranged to enable prefetching if the request is an instruction request.

* * * * *